Feb. 27, 1968 G. A. FEDDE 3,371,326

THIN FILM PLATED WIRE MEMORY

Filed June 18, 1963

INVENTOR
GEORGE A. FEDDE

BY Rene A. Kuypers
ATTORNEY 3,371,326

THIN FILM PLATED WIRE MEMORY

George A. Fedde, Norristown, Pa., assignor to Sperry Rand Corporation, New York, N.Y., a corporation of Delaware Filed June 18, 1963, Ser. No. 288,653
13 Claims. (Cl. 340—174)

The invention described herein was made in the performance of work under a NASA contract and is subject to the provisions of the National Aeronautics and Space Act of 1958, Public Law 85–568 (72 Stat. 426; 42 U.S.C. 2451), as amended.

This invention relates to a magnetic memory device and in particular, to a thin film, plated wire memory of the nondestructive readout type.

Presently known prior art memory devices are of relatively large bulk and therefore are not suitable for digital computer systems where space is at a premium. Furthermore, when such prior art memories require bit capacities on the order of one million bits or greater, the power and economic requirements may be prohibitive for many applications.

It is therefore an object of this invention to provide a new and improved thin film, plated wire memory.

It is a further object of this invention to provide a new and improved thin film, plated wire memory which provides high density packing.

In addition, it is a further object of this invention to provide a new and improved thin film, plated wire memory which is economical to fabricate.

Another object of this invention is to provide a new and improved thin film, plated wire memory which is characterized by low inductance of the word lines.

An even further object of this invention is to provide a new and improved thin film, plated wire memory which is efficient to operate.

In accordance with a feature of this invention, there is provided an electrically conducting ground plane having equally spaced, parallel grooves formed on both (hereafter referred to as first and second) of its largest surfaces. Data storage elements comprising wire substrates plated with a thin, magnetic film which has a magnetic uniaxial anisotropy (i.e., all of the magnetic moments in the film are aligned along an axis called the "easy" axis) are positioned in the grooves of the ground plane. Placed substantially orthogonal to the equally spaced and parallel data storage elements are a plurality of single-turn solenoids (i.e., a coil of wire) or word drive lines. The single-turn solenoids are also equally spaced and parallel to one another and are positioned so that one side of each of the solenoid coils is contiguous to the data storage elements positioned in the grooves of the first large surface of the ground plane, and the return side of each of the solenoids is positioned contiguous to the data storage elements placed in the grooves of the second large surface of the ground plane. Second and third ground planes, which also have data storage elements positioned in grooves formed on both of its largest surfaces, are placed in juxtaposition and in alignment (i.e., the grooves are facing in substantially the same direction) to the first and second largest surfaces, respectively, of the first mentioned ground plane. This arrangement provides increased storage capacity and dense packing of the memory elements, since each of the word solenoids wrapped around the central ground plane acts as a driver element for memory "readout" and "write in" not only for the data storage elements of the first (i.e., the central ground plane) but also for the data storage elements placed in the grooves of the surfaces of the second and third ground plane facing the largest surfaces of the first ground plane.

In accordance with another feature of this invention, the word drive solenoids of the memory are closely spaced with respect to the surface of the ground planes since the latter are grooved to receive the data storage elements. This close spacing between the memory elements (i.e., the ground planes, the data storage means and the word driver solenoids) provides a low impedance structure. Furthermore, the flux generated by the word solenoids almost entirely couples to the data storage elements. This "tight" flux coupling therefore provides a very efficient structure.

The novel features that are considered characteristic of this invention are set forth with particularity in the appended claims. The invention itself, however, both as to its organization and method of operation, as well as additional objects and advantages thereof, will best be understood from the following description when considered in conjunction with the accompanying drawing, wherein:

Figure 1:
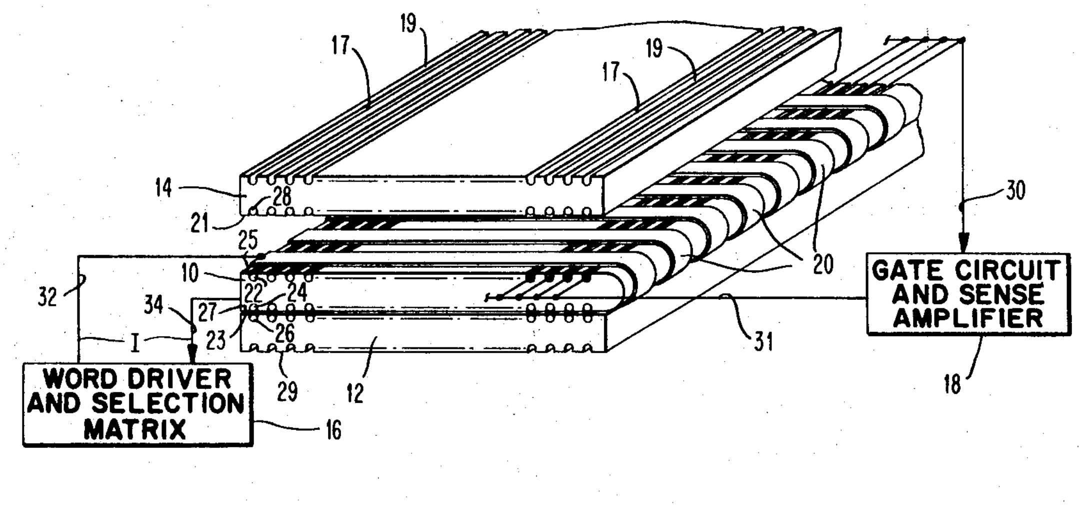
FIGURE 1 is an isometric view of the plated wire, thin film, ground plane memory system wherein the top ground plane is separated for clarity from the central ground plane and the associated circuitry is shown in block form.

The instant invention provides a metal ground plane device having equally spaced and parallel grooves which are formed on the first and second surfaces thereof. Placed in the grooves formed in the ground plane device are data storage elements or bit wires of small diameter. The surfaces of the bit wires are electroplated with a thin, magnetic film in the presence of a magnetic field which establishes a uniaxial magnetic anisotropy. This magnetic anisotrpoy establishes two stable positions along the "easy" direction of magnetization and depending upon the orientation of the magnetic vectors along the "easy" direction of magnetization, a "one" or "zero" is stored in the memory.

A plurality of single-turn solenoids or word driver straps are oriented substantially orthogonal to the bit wires positioned in the grooves of the ground plane. One side of each of the coils is placed in contiguity to the bit wires placed along the first large surface of the ground plane device, and the return side of each of the coils is positioned contiguous to the bit lines positioned along the second large surface of the ground plane device. The word straps are connected to a word driver via a word line selection matrix, which is adapted to selectively energize any one of the plurality of word straps. Second and third ground plane devices, which also have their largest surfaces grooved in a similar manner to the first ground plane device, are respectively positioned in juxtaposition and so all of the grooves are pointing in substantially the same direction as those of the first and second surfaces of said central ground plane device. For proper operation it is not necessary that the bit wires be vertically aligned (i.e., that each bit wire be positioned one on top of the other). Data storage elements are also placed in the grooves formed in the second and third ground planes. However, no word drive solenoids are positioned around the second and third ground planes, and thus one word solenoid around the central ground plane serves four times the number of bit lines along one surface, i.e., the word solenoid around the central ground plane is used to "readout" or "read in" information stored in the bit wires positioned in the first and second surfaces of the central ground plane device, as well as the bit wires positioned along the two large surfaces of the second and third ground plane devices opposite the first and second surfaces of the central ground plane member.

In operation, when the present invention is used as a random access storage device, the desired memory address is selected by energizing the desired word solenoid by means of a word driver and a matrix selection circuit. Current immediately flows along one side of the single-turn solenoid opposite the first surface of the central ground plane member and returns via the side opposite the second surface of central ground plane device. The current flowing in the selected word solenoid induces image currents in the three ground plane devices by magnetic induction. The current in the energized word solenoid coacts with the induced image currents in the three respective ground plane devices to produce an additive flux which is in the region between the ground plane devices and the solenoid. This additive flux couples to the bit positions (defined by the intersection of the word solenoid and the portion of the bit wires positioned in the four large surfaces of the ground planes contiguous to the word solenoid) and rotates each of the magnetic vectors of the thin films from the "easy" axis toward the "hard" axis of magnetization through an angle less than 90 degrees. The rotation of the magnetic vectors of the thin films induces voltages in the respective bit wires which are detected at the ends of the wires. Thus, a bit wire also acts as a sense wire. Depending upon whether a positive or negative polarity voltage is detected in the various bit-sense wires, it can be determined that either a binary "zero" or a binary "one" has been stored in the memory. A sense amplifier is connected at the ends of the bit-sense wires and is used to amplify the induced signals and present them in binary form to computer logic circuits.

Since the magnetic vector rotation is reversible, after the memory read out has taken place the magnetic vectors return to their original orientation along the "easy" axes. This reversibility provides the nondestructive readout of the memory. The reversibility of the rotation of the magnetization vectors is the result of the magnetic anisotropy of the thin film material. Therefore, if new information is to be written into the memory, it is accomplished by simultaneously energizing the bit lines and the word solenoids. This coincidence of the flux from the information current and word solenoid current is of sufficient magnitude to steer the magnetization vectors into the desired orientation along the "easy" axes.

Due to the close spacing of the word drive solenoids to the ground plane devices, the flux that is generated by an energized solenoid is confined to a small volume of space. Thus, the flux produced by the word line is almost entirely used to couple to the bit positions and hence, represents a very efficient structure. Furthermore, the word solenoid inductance and therefore its impedance is kept at a minimum due to the close spacing of the memory elements. This low word solenoid impedance is significant in that it enables the memory to be operated with very little power.

Referring now to the drawing and in particular to FIGURE 1, three ground plane devices 10, 12 and 14 hereinafter referred to as ground planes are depicted wherein they are positioned in juxtaposition to one another. The ground planes are electrically conductive and may be made of copper, magnesium, aluminum or other suitable material. Along the large surfaces 19 and 21 of upper ground plane 14, for example, as well as the large surfaces of ground planes 10 and 12, are formed equally spaced, parallel grooves which may be formed by photoetching or by chemi-milling. The number of grooves per inch may typically vary between twenty or forty depending upon the required memory capacity. It should be understood that the ground planes need not necessarily be fabricated of solid metal but may be hollowed and filled with a light weight plastic material. In such a case, the ground plane is formed by molding Plexiglas by means of pressure in accordance with a metal master having accurately machined grooves. The surface of the molded Plexiglas is then covered with a thin layer of copper by electroforming. The grooved copper sheet is then stripped away from the Plexiglas and two such sheets are positioned in the form of a receptacle with the grooves extending outwardly. The two copper grooved sheets are then made into a unitary structure by pouring a binder such as Stycast 1090 (Epoxy Casting Resin) into the formed receptacle. It is also apparent that the ground planes need not necessarily be flat but may take other shapes such as round, elliptical, etc., as required by a particular application.

Placed in the grooves such as groove 17, for example, of the ground plane 14, is a five mil diameter beryllium copper wire. The bit wires may be held in place in the grooves by a suitable coating of varnish 11 (FIGURE 2) or similar material. Before the wires are placed in the grooves however, they are electroplated with approximately a 10,000 Angstrom thickness of a nickel-iron alloy (80% nickel-20% iron). The alloy coating is electroplated in the presence of a circumferential magnetic field that establishes a uniaxial anisotropy axis at right angles (i.e., around the circumference) to the length of the wire. The uniaxial anisotropy establishes an "easy" and "hard" direction of magnetization and the magnetic vector of the thin film is normally oriented in one of two equilibrium positions along the "easy" axis, thereby establishing two bistable states necessary for binary logic applications. The bit wires may also be coated over the magnetic material with an insulating material before being positioned in the grooves of the ground plane in order to protect the magnetic coating from being damaged.

Figure 2:
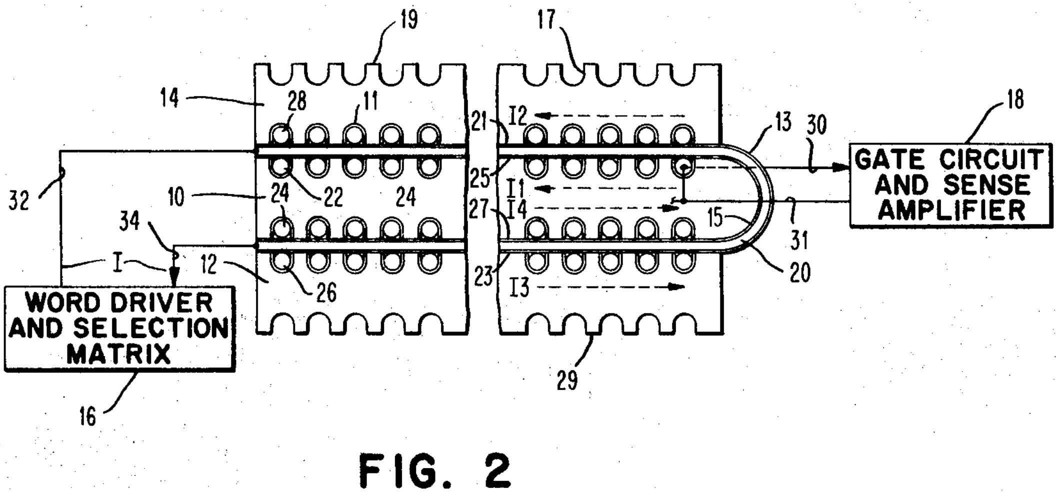
FIGURE 2 is a sectional view of the memory system depicted in FIGURE 1.

Placed substantially perpendicular to the equally spaced bit wires positioned in the parallel grooves are a plurality of equally spaced and parallel word straps or word solenoids such as solenoid 20. These straps are normally single-turn solenoids although they may also be fabricated into a multi-turn configuration. The word straps are typically twenty mils wide and placed on forty mil centers. The word straps may be formed and supported by two flexible 1 mil glass-epoxy or Mylar dielectric sheets 13 and 15 (FIGURE 2). The word strap 20, for example, is wrapped around the central ground plane 10 and connections are made by means of lead wires 32 and 34 to a word driver 16. It should be understood that the ground strap 20 need not necessarily be a single-turn solenoid configuration and hence may consist, for example, of individual flat straps. In this type of embodiment each strap would be positioned over the bit wires which are to be coupled thereto and one end is then grounded and the other end connected to a respective word driver. This scheme may be preferred when only one ground plane is used and it is required to couple to only the bit lines on one side of the ground plane. The sheets 13 and 15 are bonded to the ground plane 10 with an adhesive and in addition pressure plates (not shown) aid in holding the word lines close to the surfaces of the ground plane. In normal operations the word driver 16 is connected through a matrix selection circuit (not shown) so that a single drive unit can energize any one of a plurality of word solenoids. The glass-epoxy or Mylar dielectric sheets 13 and 15 are provided on each side of the word driver 20 in order to provide equal separation as well as to insulate the central ground plane 10 from the ground planes 12 and 14.

A bit position or location of stored information is defined by the intersection of a bit wire with a word solenoid. Thus, the word line 20 defines bit positions with respect to the bit wires 22, for example, positioned along the first large surface 25 of the central ground plane 10 and also defines bit positions with respect to the bit wires such as 24, for example, positioned along the second large surface 27 of the ground plane 10. Because of the close proximity of the ground planes 12 and 14 to the central ground plane 10, further bit positions are defined by the word line 20 in conjunction with the bit wires such as 26 and 28 positioned along the inner large surfaces 23 and 21 or the ground planes 12 and 14, respectively. In other words, the location of information along a bit wire is determined by the intersection of the bit wire and the word line passing substantially perpendicular near the bit wires. The outer large surfaces 29 and 19 of ground planes 12 and 14, respectively, which do not have bit wires depicted therein, are utilized in conjunction with other word solenoids in the event that a memory of larger bit capacity is required.

The memory of the instant invention may be word organized and may consist, for example, of 1,024 words of 1,000 bits or 2,048 words of 500 bits. Thus, assuming that the width of the ground planes is ten inches and assuming that there are twenty-five grooves or word lines per inch, a ten inch word line loop could accommodate 250 wires in each plane. It is apparent that one word line 20 would couple not only to the bit lines (i.e., at the bit positions) located in both surfaces of the central ground plane 10, but would likewise couple to the bit wires located on the inside surface 21 of ground plane 14 and the bit wires positioned on the inside surface 23 of ground plane 12. Thus, the multiple coupling to a plurality of bit positions by a single word solenoid accounts for the dense packing and large bit capacity achieved by the present invention. Furthermore, due to the simple construction of the word solenoids, the bit wires and the grooved ground planes, the memory of the instant invention can be fabricated at a relatively low cost.

In order to obtain nondestructive readout of the information stored at the bit positions associated with word strap 20, for example, the latter would be energized by the word driver 16. It should be understood, that the word driver 16 includes a word strap selection circuit, such as a diode matrix, and would be adapted to energize any of the word straps positioned along the central ground plane 20. When the word strap 20 is energized by the word driver 16, current I travels along connection 32 down the upper portion of the single-turn coil and returns to the word driver 16 via the under side of the solenoid and connection 34. The current flow in the upper side of word strap 20 causes image current I1 (shown in dotted lines as are all image currents) to be developed in the central ground plane 10; simultaneously, image current I2 flows in upper ground plane 14. The image currents are shown flowing in an opposite direction from the current flow in the upper leg of the word strap, and each image current is one-half the magnitude of I (i.e., the magnitude of I equals the sum of the image currents I1 and I2). In like manner, the flow of I in the return path of the word solenoid 20 causes image current I4 and I3 to flow in the opposite direction in the ground planes 10 and 12, respectively. The magnitude of I substantially equals the sum of the image currents I3 and I4.

The image currents I1 and I2, for example, developed in the ground planes 10 and 14, respectively, by the driving current I in the upper half of the word solenoid 20, are the result of the fact that the energizing of said solenoid 20 by a short duration current pulse produces a change of flux ($d\phi/dt$), which is coupled to the above-mentioned ground planes. This change of flux thereby induces currents in the ground planes 10 and 14 which together are of approximately equal magnitude and opposite in direction (in accordance with the Right Hand Rule) to the primary current I. The image currents in the ground planes are said to be approximately equal to the driving current as long as the energizing current pulse applied by the word driver 16 is of relatively small duration and the image currents do not have time to decay. The image current decays over a period of time since it does not have a zero resistance path.

The currents that are transmitted along the word solenoid 20 in conjunction with the image currents developed in the ground planes 10, 12 and 14, produce an axial flux field (i.e., along the length of the wire and therefore at right angles to the "easy" direction of magnetization) which rotates the magnetization vectors of the various bit positions from one of the two equilibrium positions along the "easy" axis toward the "hard" axis. Thus, for example, as the current I travels down the upper side of word solenoid 20 and image current I1 flows in the opposite direction in the ground plane 10, a flux field is generated between the ground plane and word solenoid which is additive in accordance with the Right Hand Rule. The axial flux field that is generated by the current in the word solenoid 20 rotates the magnetic vectors at each of the bit positions under the word solenoid from the "easy" axis toward the "hard" axis through an angle less than 90 degrees. Rotation of the magnetic vectors by the axial flux field through an angle of less than 90 degrees prevents destructive readout of the memory information. If the rotation were equal to 90 degrees from the "easy" axis, there might be a destructive readout since the magnetic moments would be rotated so they could return to either rest position along the "easy" axes. If there were a destructive readout, a memory rewrite step would then have to be initiated by the computer immediately after readout in order to restore the original vector orientation. The current I in conjunction with the image current I2 induced in ground plane 14 produces an axial flux field which rotates the magnetic vectors of the bit positions located along the bit wires 28, for example, positioned along the large surface 21. In like manner, as the current I returns to the word driver 16 via the return portion of solenoid 20, an axial flux field is generated by the current I and the image current I4 (in the ground plane 10), thereby rotating the magnetic vectors of the thin film bit positions 24 located along the large surface 27. The current I in conjunction with the image current I3 induced in the ground plane 12 produces an axial flux field which rotates the magnetic vectors of the thin film located at the bit positions of the bit wires 26 located along large surface 23.

The rotation of the magnetic vectors at the various bit positions when rotated from the "easy" axis toward the "hard" axis induce opposite polarity voltages in the bit wires 22, 24, 26 and 28 (i.e., the bit wires also serve as sense wires). The polarity of each of the signals induced in the sense wires is detected in a sense amplifier, such as sense amplifier 18, and such detection determines whether the bit position has been storing a binary "one" or a "zero." The purpose of the sense amplifier connected to the sense wires is to amplify the induced voltages produced by the computer readout and present them in binary form to various logic circuits. For ease of understanding, only one sense amplifier 18 is depicted and is connected to a single sense wire via the connecting lines 31 and 30. However, it should be understood that each bit wire would conventionally be connected to a gate circuit or switching matrix whose function would be to connect the bit lines of the desired word to the sense amplifier 18 and to block undesired signals and transients from entering the amplifiers. It is to be noted that the dual function of the plated wires which act both as bit wires and sense wires is another reason for the economies realized in the instant invention.

After the word solenoid 20 has been energized by the word driver 16 and the sense amplifier 18 has determined the orientation of the magnetic vectors at the various bit positions, the axial flux field is removed and the vectors return to their original orientations along the "easy" axes. The reversibility (i.e., the return to the original orientation along the "easy" axes) of the magnetization vectors is dependent upon the magnetic anisotropy of the nickel-iron alloy plated on the bit wire surfaces, and as previously mentioned, accounts for the non-destructive capability of the memory.

The construction of the memory of the instant invention provides a word solenoid which is characterized by a small self inductance. This results from the fact that the word straps, such as strap 20, are closely positioned to the ground planes and to the bit wires placed in the grooves of the ground planes. Thus, the inductance of the word line is due to the flux generated by an energized word strap being coupled almost entirely to the magnetic film located at the various bit positions. This feature is significant in that a low impedance structure is provided which requires minimum drive current and results in a fast rise time of the driving current. Furthermore, the "tight" flux coupling of this invention provides a very efficient structure since substantially all of the flux generated by the word solenoids is used to switch the magnetic vectors provided by the data storage elements.

The reduced self inductance of the word lines of the instant invention can be shown mathematically by means of the following formula $$L=\frac{d}{w}4\pi 10^{-7}\mu$$

where L equals inductance, $d$ equals the distance between the word solenoid and the ground plane, $w$ equals the width of the word solenoid and $\mu$ equals the permeability.

From the formula above it can be readily shown that since the distance ($d$) has been materially reduced, because the ground planes have been grooved to receive the bit wires, the inductance (L) is correspondingly reduced.

The plated wire storage elements, 28, for example, is also a low impedance structure since it approximates a coaxial transmission line. This may be readily appreciated since the wire itself provides the center conductor of such a coaxial line, the varnish 11 the insulator and the groove of the ground plane is the outer conductor. Accordingly, the plated wire storage element provides a low impedance structure for the signal induced in the plated wire during the memory read cycle as well as the bit current during a write cycle.

When new information is to be written into the memory, a bit current of the correct polarity is sent down the plated wire in coincidence with current in the word strap. The presence of the bit current tilts (i.e., adds the necessary additional movement) the magnetization vector toward the desired "easy" axis orientation so that after the current is turned off, the magnetization vectors fall in the desired direction. The magnitude of the bit current required for the write operation is small because the current in the word strap rotates the magnetization vector to almost 90° from the easy axis and the bit current flux field is only required to steer the magnetization vectors through the 90° positions. Additional circuitry such as digit drivers and a digit matrix which are required to write new information into the memory are not depicted in the drawings since this circuitry is conventional in the plated wire memory art.

In summary, the instant invention provides a memory device for use with, for example, a digital computer which provides high density packing. High density packing is obtained by means of grooved ground planes into which are placed magnetic plated wires. Placed substantially orthogonal to the plated wires are equally spaced, parallel word solenoids or word straps. The grooves in the ground plane permit a very close spacing of the ground plane to the word line giving a low impedance structure. Furthermore, the inductance of such a word line is almost entirely due to coupling to flux switching in the bit lines and thus represents a very efficient memory.

Obviously, many modifications and variations of the present invention are possible in the light of the above teaching. It is therefore to be understood that within the scope of the appended claims, the invention may be practiced otherwise than as specifically described.

The embodiments of the invention in which an exclusive property or privilege is claimed are defined as follows:

1. A memory device comprising, a first ground plane having first and second surfaces, said ground plane having at least one groove formed along both said first and second surfaces, a second ground plane having first and second surfaces wherein said first surface has at least one groove formed on its first surface, said first surfaces of said first and second ground planes, respectively, being placed in juxtaposition and substantially parallel to one another, data storage means positioned in said spaced grooves of said ground plane, said data storage means comprising a thin film having the property of uniaxial anisotropy formed on the surface of a signal conducting means, said uniaxial anisotropy establishing "easy" and "hard" directions of magnetization, the magnetization vectors of said film being normally oriented in one of two equilibrium positions along said "easy" direction of magnetization, a flux generator means positioned in close proximity to said first and second ground planes to generate an image current which flows in said first and second ground planes, a flux being thereby generated between said flux generator and said first and second surfaces of said first ground plane and between said flux generator and the first surface of said second ground plane, thereby rotating the magnetization vectors of said thin films of said data storage means from said "easy" axis to an angle less than 90° therefrom.

2. A memory device according to claim 1 wherein said flux generator comprises a single-turn solenoid.

3. A memory device according to claim 1 wherein said flux generator comprises a multi-turn solenoid.

4. A memory device according to claim 1 wherein said signal conducting means comprises a wire substrate made of beryllium copper.

5. The memory device in accordance with claim 1 wherein said thin film comprises a ferromagnetic material having an approximate composition of 80% nickel and 20% iron.

6. The memory device in accordance with claim 1 wherein said respective data elements are further connected to bit drivers.

7. A memory device comprising, a first ground plane having first and second surfaces, said ground plane having at least one groove formed along both said first and second surfaces, a second ground plane having first and second surfaces wherein said first surface has at least one groove formed on its first surface, said first surfaces of said first and second ground planes, respectively, being placed in juxtaposition and substantially parallel to one another, data storage means positioned in said spaced grooves of said ground plane, said data storage means comprising a thin film formed with the property of uniaxial anisotropy on the surface of a signal conducting means, said uniaxial anisotropy establishing an "easy" and "hard" direction of magnetization, the magnetization vectors of said thin film being normally oriented in one of two equilibrium positions along said "easy" direction of magnetization, at least one single-turn solenoid means having first and second legs, said first and second legs of said solenoid being positioned in close proximity to said first and second surfaces, respectively, of said first ground plane, to generate image currents which flow in both said first and second ground planes, a flux being generated between said first and second legs of said solenoid and said first and second surfaces of said first ground plane, respectively, and between said first leg of said solenoid and said first surface of said second ground plane, to read out information stored thereat.

8. A memory device comprising, a first ground plane having first and second surfaces, said ground plane having at least one groove formed along both said first and second surfaces, a second ground plane having first and second surfaces wherein said first surface has at least one groove formed on its first surface, said first surfaces of aid first and second ground planes, respectively, being placed in juxtaposition and substantially parallel to one another, a third ground plane having first and second surfaces wherein said first surface has at least one groove formed on its first surface, said second and first surfaces of said first and third ground planes, respectively, being placed in juxtaposition and substantially parallel to one another, data storage means positioned in said spaced grooves of said ground plane, said data storage means comprising a thin film plated on the surface of a signal conducting means, said thin film being formed with the property of uniaxial anisotropy, said uniaxial anisotropy establishing "easy" and "hard" directions of magnetization, the magnetization vectors of said thin film being normally oriented in one of two equilibrium positions along said "easy" direction, a flux generator means positioned in close proximity to said first, second and third ground planes to generate a flux between said flux generator and said first and second surfaces of said first ground plane, between said flux generator and the first surface of said second ground plane, and between said flux generator and said first surface of said third ground plane, thereby rotating the magnetization vectors of said thin films of said data storage means from said "easy axis" to an angle less than 90° therefrom.

9. A memory device comprising, a first ground plane having first and second surfaces, said ground plane having at least one groove formed along both said first and second surfaces, a second ground plane having first and second surfaces wherein said first surface has at least one groove formed on its first surface, said first surfaces of said first and second ground planes, respectively, being placed in juxtaposition and substantially parallel to one another, a third ground plane having first and second surfaces wherein said first surface has at least one groove formed on its first surface, said second and first surfaces of said first and third ground planes, respectively, being placed in juxtaposition and substantially parallel to one another, data storage means positioned in said spaced grooves of said first, second and third ground planes, said data storage means comprising a thin film plated on the surface of a signal conducting means, said thin film being formed with the property of uniaxial anisotropy, said uniaxial anisotropy establishing "easy" and "hard" directions of magnetization, the magnetization vectors of said thin film being normally oriented in one of two equilibrium positions along said "easy" direction, at least one single-turn solenoid means having first and second legs, said first and second legs of said solenoid being positioned in close proximity to said first and second surfaces of said first ground plane, respectively, to generate image current flow in said first, second and third ground planes, a flux being generated between said first and second legs of said solenoid and said first and second surfaces of said first ground plane, respectively, between said first leg of said solenoid and said first surface of said second ground plane and between said second leg of said solenoid and the first surface of said third ground plane, thereby rotating the magnetization vectors of said thin films of said data storage means from said "easy" to an angle less than 90° therefrom.

10. A memory device comprising, a first ground plane having first and second surfaces, a second ground plane having first and second surfaces, said first surfaces of said first and second ground planes being placed in juxtaposition and substantially parallel to one another, data storage means positioned on said first surfaces of said ground planes as well as on said second surface of said first ground plane, said data storage means comprising a thin film having the property of uniaxial anisotropy formed on the surface of a signal conducting means, said uniaxial anisotropy establishing "easy" and "hard" directions of magnetization, the magnetization vectors of said film being normally oriented in one of two equilibrium positions along said "easy" direction of magnetization, a single flux generator means juxtaposed to said first surfaces of said ground planes as well as to second surface of said first ground plane to generate image currents therein, whereby when said flux generator is energized, an image current is caused to flow in said first and second ground planes thereby rotating said magnetization vectors of said thin films from said easy axis toward said hard axis.

11. The memory device in accordance with claim 10 wherein said respective data storage means are connected to a gate circuit and sense amplifier.

12. The memory device in accordance with claim 10 wherein said flux generator is connected to a word driver and selection matrix.

13. A memory device comprising, a first ground plane having first and second surfaces, a second ground plane having first and second surfaces and a third ground plane having first and second surfaces, said first surfaces of said first and second ground planes being positioned in juxtaposition and substantially parallel to one another, said first surface of third ground plane and said second surface of said first ground plane being positioned in juxtaposition and substantially parallel to one another, data storage means positioned on said first surfaces of said first, second and third ground plane as well as said second surface of said first ground plane, said data storage means comprising a thin film having the property of uniaxial anisotropy formed on the surface of a signal conducting means, said uniaxial anisotropy establishing "easy" and "hard" directions of magnetization, the magnetization vectors of said film being normally oriented in one of two equilibrium positions along said "easy" direction of magnetization, a single flux generator means juxtaposed to said first surfaces of said ground planes as well as to said second surface of said first ground plane to generate image currents therein, whereby when said flux generator is energized, an image current flows in said first, second and third ground planes to thereby rotate said magnetization vectors from said "easy" toward said "hard" axis of magnetization, the signal present in said respective data storage elements being detected by said respective sense amplifier.

References Cited

UNITED STATES PATENTS

| | | | |
|---|---|---|---|
| 3,201,767 | 8/1965 | Bradley | 340—174 |
| 3,175,200 | 3/1965 | Hoffman et al. | 340—174 |
| 3,131,382 | 4/1964 | Valenta | 340—174 |

BERNARD KONICK, *Primary Examiner.*

S. M. URYNOWICZ, *Assistant Examiner.*